Feb. 17, 1925.
C. A. EDDY
1,526,535
TRAY TURNER
Filed Feb. 23, 1921
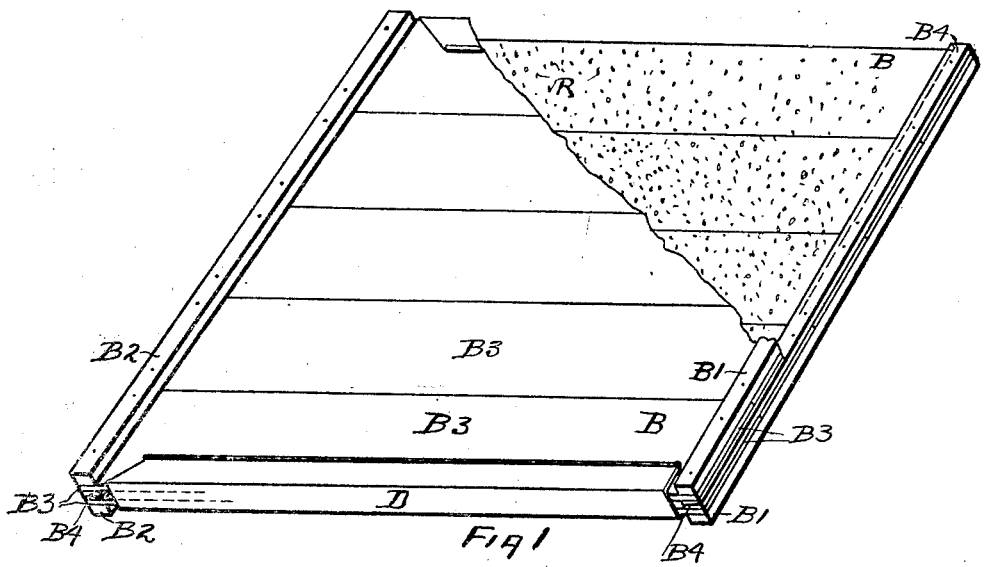
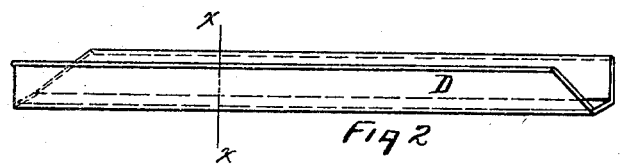
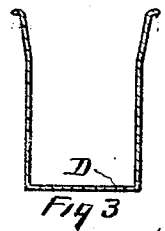
Charles Albert Eddy INVENTOR.
BY
Francis C Huebner ATTORNEY.

Patented Feb. 17, 1925.

1,526,535

UNITED STATES PATENT OFFICE.

CHARLES ALBERT EDDY, OF CLOVIS, CALIFORNIA.

TRAY TURNER.

Application filed February 23, 1921. Serial No. 447,236.

*To all whom it may concern:*

Be it known that I, CHARLES ALBERT EDDY, a citizen of the United States, and resident of Clovis, in the county of Fresno and the State of California, have invented a new and useful Improvement in Tray Turners, of which the following is a specification.

My invention relates to a device for clamping two trays together while being turned. It is commonly known to those familiar with the art that in the raisin and fruit districts of California the fruit is dried in the sun, and for this purpose trays of a uniform size, approximately two feet by three feet are used to hold the fruit while being dried. When the fruit is laid in the sun sufficient to dry the upper side of the fruit it is necessary to turn it over and the practice at the present time is to lay an empty tray on the top of a tray which has fruit thereon, to hold the two trays firmly together, usually two men being required for this purpose, the trays then being turned over and the one on which the fruit has theretofore been, being on the top, is removed, leaving the fruit turned over on the new tray. Heretofore much fruit and raisins have been wasted by falling out of the sides of the tray inasmuch as the trays used have cleats on two sides only.

The object of my invention is to produce a clamp which is readily attached to the trays where arranged for turning the fruit so that the trays will be readily held together and can be turned by one person so that the raisins will not spill out at the sides of the tray when being turned. I accomplish this and other objects hereinafter set forth by means of the device described in the accompanying specification and illustrated on the accompanying drawing in which Figure 1 shows two trays (a portion of one being broken away) which are arranged for turning the fruit and the clamp which I have invented being shown thereon. Figure 2 is a view of a single clamp. Figure 3 is a sectional view of the clamp along the line $x$—$x$ in Figure 2. In said drawing B is a tray which is constructed of base cleats $B^1$ and $B^2$, a plurality of boards $B^3$ are clamped to the bottom tray and smaller cleats $B^4$ and $B^5$ which are nailed from the top of boards B and directly over the base cleats $B^1$ and $B^2$. R is intended to represent a plurality of raisins drying on the tray. D is the clamp which consists of a piece of metal bent in the shape of a U as shown in Figure 2. The upper end of the stems U are flared outward, and the extreme end of the stems are beaded for the purpose of strengthening the clamp. At each end of the U-shaped clamp a stem is sheared off at an angle to the base. This clamp should be constructed the approximate length of the trays between the cleats $B^1$ and $B^2$. It will be noted that when the empty tray is placed over the top of the tray containing raisins as shown in Figure 1 the clamp D can be forced over the bottom boards of the two trays where they are parallel to each other, thus closing up the ends of the opening between the trays. When in this position the tray can be turned by one person in either direction.

I claim as new and ask for Letters Patent:

A device for turning two trays having bottoms and cleats on two opposite edges assembled so the cleats of one tray register with the cleats of the other, consisting of a channel member adapted to engage the edges of the two trays between the cleats on two sides thereof and to clamp said bottoms together.

CHARLES ALBERT EDDY.